April 23, 1968    H. D. WEBB    3,379,131
SUSPENSION ASSEMBLY
Filed Oct. 22, 1965    2 Sheets-Sheet 1
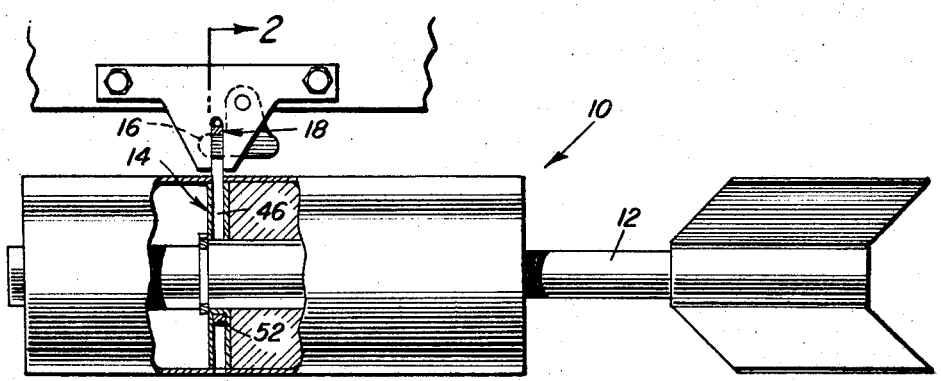
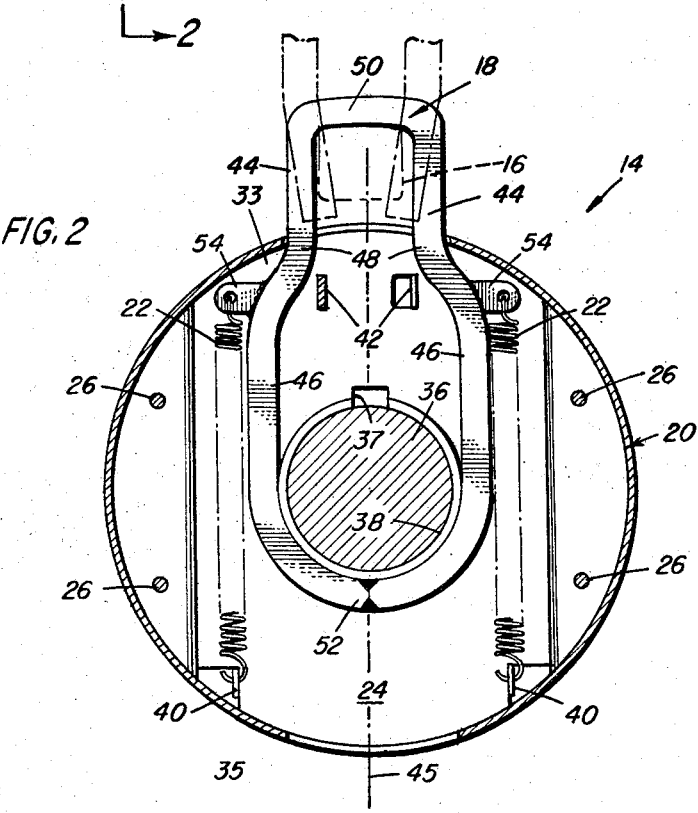
INVENTOR
HORACE D. WEBB
BY Claude Fankhouser
ATTORNEY

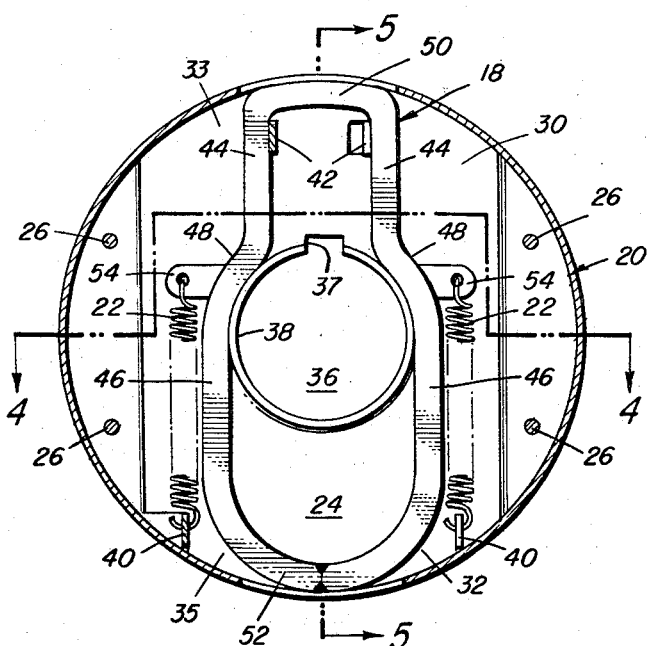
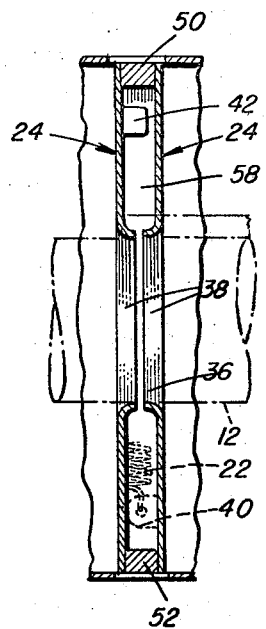
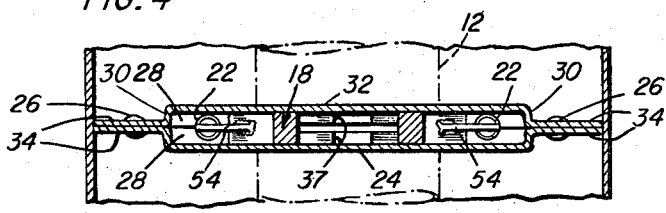
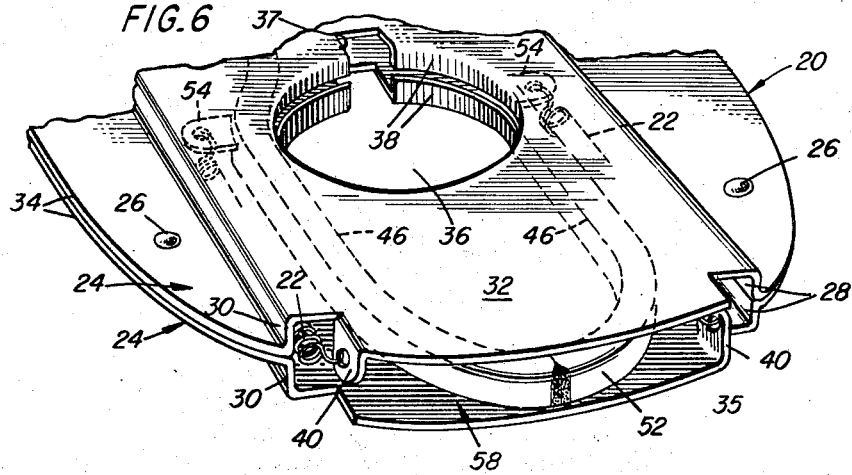

3,379,131
SUSPENSION ASSEMBLY
Horace D. Webb, Dahlgren, Va., assignor to the United States of America as represented by the Secretary of the Navy
Filed Oct. 22, 1965, Ser. No. 502,722
5 Claims. (Cl. 102—7.6)

ABSTRACT OF THE DISCLOSURE

A suspension assembly, for use with a practice ordnance device, designed as a self-contained unit so as to facilitate interchangeable use and replacement. The assembly's bomb attaching means is maintained wholly within the unit when not in use.

---

The invention described herein may be manufactured and used by or for the Government of the United States of America for governmental purposes without the payment of any royalties thereon or therefor.

This invention relates to improvements in suspension means and more particularly it relates to a holding assembly which can be mounted, for example, on drop-type ordnance and which can be employed for holding such ordnance to the underside of an aircraft.

It is highly desirable that drop-type projectiles be devoid of suspension protuberances which will produce drag or noise when the projectiles are moving through the air and which can damage the underside of the aircraft upon release. Likewise, it is desirable to have a suspension means for such projectiles made as a self-contained unit such as to permit interchangeable use or replacement of such suspension means. The present invention is directed toward the achievement of the above-mentioned desirable characteristics of a suspension assembly.

Accordingly, an object of the present invention is to provide a self-contained suspension assembly.

Another object of the present invention is to cooperatively associate a self-contained suspension appartus with a load to be air-dropped in such a manner that there are no protruding portions of the suspension means once the load has been released from the carrying vehicle.

A further object of the present invention is to provide a self-contained suspension assembly having an attaching means normally biased into a retracted position.

Still another object of the present invention is to provide a suspension device on a practice bomb, or the like, which will have no portion of the suspension device protruding once the practice bomb has been released from the aircraft.

Yet another object of the present invention is to provide a suspension assembly in which the attaching means can be readily extended from within the housing of the suspension assembly.

Other objects, advantages and novel features of the present invention will become apparent from the following detailed description of the invention when considered in conjunction with the accompanying drawings wherein:

FIG. 1 is a side elevation with portions broken away and partly in section of a practice bomb with the suspension assembly of the present invention shown in extended position;

FIG. 2 is transverse sectional view on line 2—2 of FIG. 1;

FIG. 3 is a sectional view similar to FIG. 2 showing the attaching means in retracted position;

FIG. 4 is a sectional view on line 4—4 of FIG. 3;

FIG. 5 is a sectional view on line 5—5 of FIG. 3; and

FIG. 6 is a fragmental perspective view of the bottom portion of the suspension assembly.

For the purpose of illustrating the use the suspension assembly of the present invention FIG. 1 shows a practice bomb 10 having a signal tube 12 and a retractable suspension assembly 14 keyed on to the signal tube. A hook 16 on the underside of the aircraft is connected to the retractable lug 18 of the suspension assembly 14 and retains the practice bomb in position. It is obvious that the suspension assembly can be similarly employed with many different type loads when it is desired that the attaching means of the suspension assembly not be exposed once released.

Referring to the details of the suspension assembly 14 shown in FIGS. 2–4, it can be seen that basically the assembly comprises an attaching means such as the retractable lug 18 biased into a retracted position within housing 20 by suitable resilient means such as springs 22, for example.

The housing 20 comprises two generally symmetrical side plates 24 held together by rivets 26. Since each side plate is substantially identical, only one will be described in detail. Each side plate is a substantially circular disc formed into a rectanguar channel 28 (see FIGS. 4 and 6) having two side walls 30, 30, web 32 and a flange 34 extending substantially perpendicularly from each wall 30. For purposes of orientation, the channel 28 of each side plate has a top portion 33 and a bottom portion 35, as viewed in FIGS. 2 and 3. The center of each side plate is formed with a mounting opening 36 and a keyway slot 37 in web 32.

Around the mounting opening 36 of each side plate is formed a lip 38 which projects into the channel 28 (see FIGS. 5 and 6), and which acts as a lug guide and stop means, as will hereinafter be described. Each side plate is also formed with a spring mounting tab 40 at the bottom of the channel and a guide tab 42 between the mounting opening and the top of the channel; both tabs are cutout portions from web 32 and which are bent into the channel in such a manner that they are substantially perpendicular to web 32.

The lug means 18 is formed with two sets of co-planar and co-parallel legs 44, 44 and 46, 46 symmetrically arranged about axis 45 (FIG. 2) and joined together by shoulder portions 48. The outer extremities of legs 44 are joined by an upper bight portion 50 and legs 46 are joined by lower bight portion 52. Projecting outwardly from the shoulder portions 48 are mounting lugs 54 for connecting the spring biasing means to the lug means. Two side plates 24 are joined together to form a housing with the flanges of each side plate abutting the flanges of the other and with the top and bottom of each channel being positioned opposite each other. The channels 28 of each side plate form a guide slot generally indicated at 58 (FIG. 6) which is perpendicular to the coaxial mounting openings 36 of the side plates. The retractable lug 18 is slidably mounted within the guide slot 58 such that the parallel legs 44 straddle guide tabs 42 and parallel legs 46 straddle lips 38. Two springs 22 are each attached to a spring mounting tab 40 and a spring mounting lug 54 for retaining the lug means 18 in a retracted position.

As can be seen, the guide tabs 42 of the side plates function as guides for parallel legs 44 of the lug means 18, and the lips 38 around mounting openings 34 of the side plates likewise function as guides for the parallel legs 46. The lips 38 of the side plates also cooperate with lower bight portion 52 and shoulder portions 48 to limit the two extremes of extension and retraction of lug means 18. In addition, the opening at the bottom of housing 20 (FIG. 6) facilitates the extension of upper bight portion 50 by allowing the lower bight portion 52 to be pushed inwardly by a screwdriver or other tool.

There is thus provided a suspension assembly made as a self-contained unit which can be readily replaced or used interchangeably with other such assemblies and which has a retractable lug means which is easily extended. The self-contained suspension assembly has been described as being employed with a practice bomb only for purposes of illustration, however, it will be clear that such an assembly can be employed with any load that is to be air dropped or with any load in which it is desired that the attaching means not project from the assembly once the attaching means has been released.

Obviously many modifications and variations of the present invention are possible in the light of the above teachings. It is therefore to be understood that within the scope of the appended claims the invention may be practiced otherwise than as specifically described.

What is claimed is:

1. A suspension assembly especially adapted for use with a practice ordnance device having a longitudinally disposed signal tube therein comprising
    a housing consisting of a pair of plates;
        said plates each having opposed portions of its edges shaped to the external contour of the practice ordnance device to be suspended;
        said plates each having an opening of a size greater than the diameter of said signal tube;
    means securing said plates in spaced-apart relation to form a guide slot with said openings in coaxial relation;
    a drop bomb attaching member slidably mounted within the guide slot and having an opening adapted to be aligned with the openings in the plates;
    one end of the bomb attaching member comprising bomb attaching means; and
    resilient means for normally maintaining the drop bomb attaching member wholly within the housing so that the end of the bomb attaching member opposed to the bomb attaching means is positioned adjacent the contoured edge of the plate so that pressure on the bomb attaching means at this point will extend the bomb attaching means from the housing.

2. A practice bomb having a longitudinally disposed signal tube therein comprising
    a housing consisting of a pair of plates adapted to be snugly received within the practice ordnance device in transverse relation thereto, said plates together defining a rectangular guide slot in the plane of said housing, said plates having coaxial openings therein, said signal tube being received by said plates through the coaxial openings;
    drop bomb attaching means slidably mounted in said housing within the guide slot capable of movement in and out of said housing, the drop bomb attaching means encompassing the guide tube; and
    resilient means for maintaining said attaching means wholly within said housing.

3. The suspension assembly of claim 2 wherein said plates are provided with inwardly directed lip means around a portion of the openings for both guiding and limiting said attaching means upon movement out of said housing.

4. The suspension assembly of claim 3 wherein the guide slot of said plates is open to the exterior of the ordnance device at the bottom to facilitate access to said attaching means for movement thereof out of said housing.

5. The suspension assembly of claim 4 wherein said resilient means comprises a pair of coil springs, each of said springs being attached to said housing and said attaching means for conjoint operation.

References Cited

UNITED STATES PATENTS

| 1,348,970 | 8/1920 | Thompson | 248—361 X |
| 1,783,299 | 12/1930 | Mirick | 102—17.6 X |
| 2,069,759 | 2/1937 | Hofstetter | 102—7.6 |

FOREIGN PATENTS

| 42,064 | 11/1937 | Netherlands. |

SAMUEL W. ENGLE, *Primary Examiner.*